Patented Dec. 25, 1945

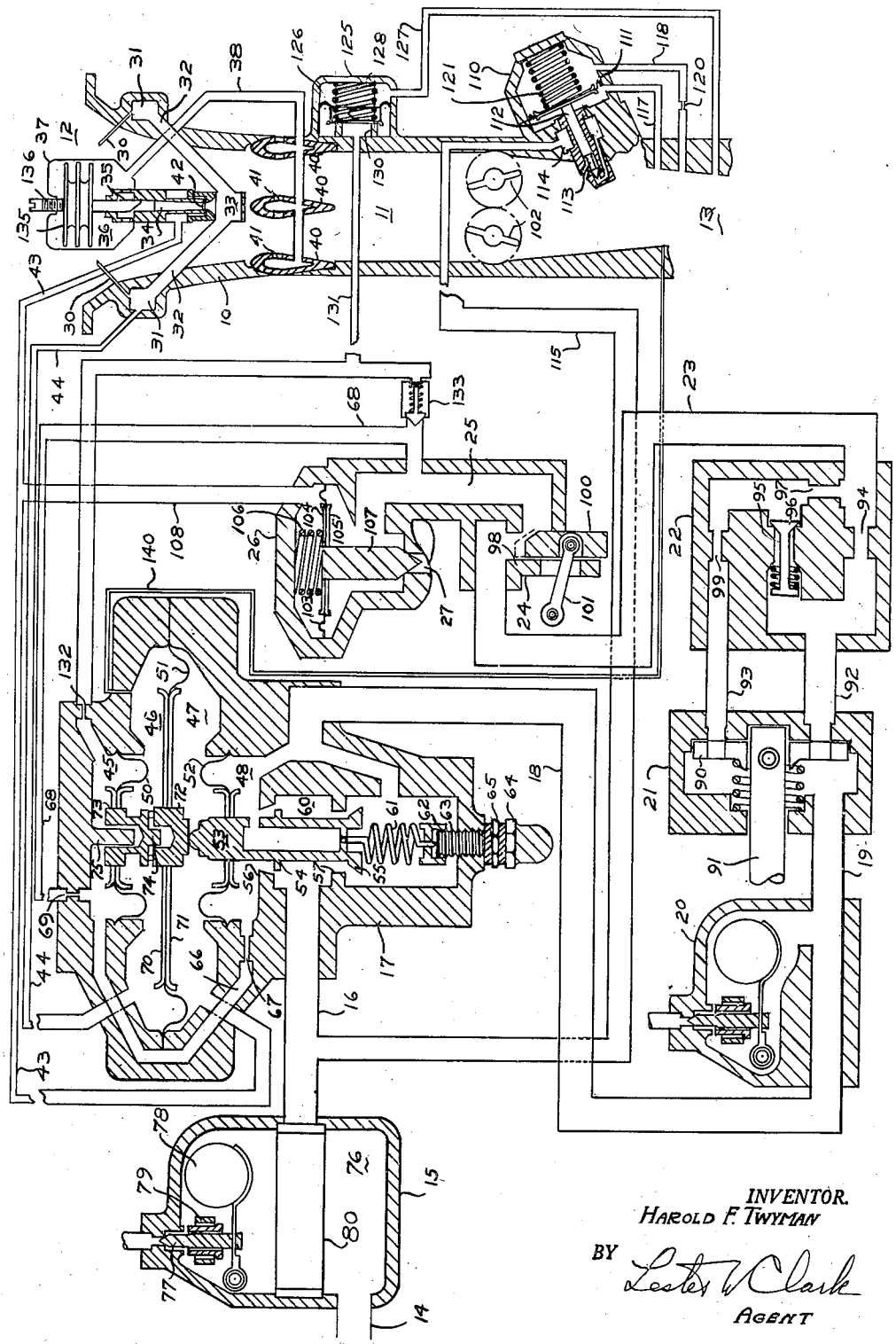

2,391,755

UNITED STATES PATENT OFFICE 2,391,755

CARBURETOR

Harold F. Twyman, Dayton, Ohio, assignor to Chandler-Evans Corporation, South Meriden, Conn., a corporation of Delaware Application May 11, 1943, Serial No. 486,599

11 Claims. (Cl. 261—69)

The present invention relates to carburetors, and particularly to carburetors adapted for use on aircraft, wherein the air and fuel supplied to the engine are proportioned in a definite ratio to insure optimum combustion of the fuel in the engine.

In such carburetors, the quantity of air flowing through the carburetor is commonly measured by a Venturi meter or other suitable flow meter, and a force developed by the meter in proportion to the air flow is used to operate a valve which controls the fuel flow.

It is an object of the present invention to provide, in a carburetor of the type described, improved means for producing a metering force proportional to the flow of air entering the carburetor.

Another object of the present invention is to provide improved means for measuring the air flow through a large air passage, wherein the metering force produced is representative of the average velocity of the fluid flowing through the entire cross section of the passage.

A further object of the present invention is to provide an improved Venturi meter, wherein the force developed by the meter is amplified by a boost Venturi meter which is enclosed so as to be entirely separate from the main air passage.

A further object of the invention is to provide flow measuring means including improved means for compensating the flow measurement for the pressure and temperature of the fluid being measured so as to produce a metering force proportional to the mass of fluid being measured.

A further object of the invention is to provide improved flow measuring means of the type described, wherein a boost Venturi meter is connected in a passage between the intake and the throat of a main venturi, and wherein a valve responsive to the pressure and temperature of the flowing fluid is used to control the flow thru the boost venturi so that its velocity is a measure of the mass of air passing thru the main venturi.

Other objects and advantages of the present invention will become apparent from a consideration of the appended specification, claims, and drawing, in which the single figure represents diagrammatically an aircraft carburetor and controlling devices therefor embodying the principles of my invention.

Referring now to the drawing, there is shown at 10 the main body portion of an aircraft carburetor including a main air passage 11, through which the air flows from an entrance 12 to an outlet 13 which connects, by means not shown, to the intake of a supercharger by which the air is forced into the engine under pressure.

The fuel supply for the engine comes from a pump or other source of fuel under pressure, and passes through a conduit 14, a vapor trap 15, a conduit 16, a fuel regulator unit 17, a conduit 18, a second vapor trap 20, a mixture control unit 21, a jet system generally indicated at 22, a conduit 23, an idling control 24, a conduit 25, a pressure regulator 26, and a passage 27 to a fuel injection unit, not shown. The fuel injection unit may preferably be of the type known as a spinner injector, wherein the fuel is introduced into the air stream through suitable orifices in the rotor of the supercharger.

The carburetor 10 may be of the rectangular type shown in the copending application of Milton E. Chandler, Serial 406,776, filed August 14, 1941, now Patent No. 2,361,993, issued Nov. 7, 1944. Near the air entrance 12 of the carburetor a plurality of impact tubes 30 project into the air stream, with their ends open in a direction to receive the dynamic pressure of the air flowing into the carburetor. These impact tubes open into a passage 31 which interconnects all the impact tubes, and is commonly termed a vent ring. Passages 32 connect the vent rings 31 with a chamber 33. A boost venturi 34 is mounted so that its entrance is in communication with the chamber 33. The discharge end of the boost venturi is connected thru a valve 35 with a chamber 36 within a housing 37. The interior of chamber 36 communicates through a conduit 38 with the interiors of a plurality of parallel hollow Venturi members 40 which are located in the air passage 11. Each of the Venturi members 40 is provided with apertures 41 at or near the point of smallest cross section of the passage 11.

The carburetor body 10 is rectangular, and the air pressures existing therein at spaced points in a given cross-sectional plane may be unequal. By the use of a plurality of hollow Venturi members 40, each having spaced apertures 41, and connecting the interiors of all the Venturi members to a common conduit 38, the pressure in the conduit 38 is made to represent accurately the average pressure at the throat of the venturi.

It will be seen that the pressure at the impact tubes 30 is higher than the pressure at the apertures 41 in the Venturi members 40, and that, in accordance with the well known characteristics of Venturi meters, this pressure differential is a function of the velocity of the air flowing through the passage 11. Because of this pressure differential, a continuous flow of air takes place through a second air passage, which may be traced thru the impact tubes 30, the conduit 32, chamber 33, boost venturi 34, valve 35, chamber 36, conduit 38, the interior of the Venturi members 40, and out through the apertures 41 into the main air stream. Although the pressure differential across the second air passage is a function of the velocity of the air flowing in the main air passage 11, the air flow thru the second air passage is controlled by the valve 35, as hereinafter described, so that the velocity of the air flow thru the second passage is a measure of the mass of air flowing per unit time thru the main air passage 11.

The boost venturi 34 is provided with an annular opening 42 at its throat. The opening 42 communicates through suitable passages with a conduit 43. In accordance with the known characteristics of Venturi meters, the pressure at the opening 42 is lower than the pressure at the openings 41, and the differential between the pressure at the impact tubes 30 and the pressure at the opening 42 is a measure of air flow through the second air passage previously traced. It may, therefore, be seen that the boost venturi 34 provides a pressure differential which is a measure of the mass of air flowing per unit time through the main passage 11, but which is larger than the pressure differential which would be obtained by means of a single Venturi arrangement such as the Venturi members 40.

The pressure at the impact tubes 30 is conveyed through vent ring 31 and conduit 44 to the fuel regulating unit 17. The pressure at the opening 42 in the throat of boost venturi 34 is conveyed through conduit 43 to the fuel regulator unit 17, where these two pressures are compared in order to produce a controlling force proportional to the difference between them.

The fuel regulator 17 comprises a hollow casing which is divided into a series of four expansible chambers 45, 46, 47 and 48 by means of three flexible diaphragms 50, 51 and 52. The outer peripheries of diaphragms 50, 51, and 52 are attached to the casing of the regulator unit 17 by any suitable means, not shown.

A balanced valve member 53 is supported centrally of the diaphragm 52, in any suitable manner. The valve 53 is provided with a pair of flanges 54 and 55, which cooperate respectively with stationary valve seats 56 and 57, which may be formed in the casing of the regulator 17. When the valve 53 is seated, it separates an inlet chamber 60 connected to the conduit 16 from the expansible chamber 48, which serves as the outlet chamber of the valve and is connected to the conduit 18. A tension spring 61 is attached to the lower end of valve member 53 and to a nut 62 carried by a bolt 63 which threadedly engages an aperture in the bottom of the casing of regulator 17. The lower extremity of the nut 63 is provided with an hexagonal head 64 by which it may be turned to adjust the tension in the spring 61. A lock nut 65 is provided to maintain the bolt 63 in any position to which it may be adjusted.

The chamber 48 is connected through a passage 66 having a restriction 67 therein to the interior of chamber 45. Chamber 45 is connected through a conduit 68 having a restriction 69 therein to the conduit 25 adjacent the pressure regulator 26.

A pair of discs 70 and 71 are clamped, by any suitable means, on opposite sides of a central aperture in the diaphragm 51. A force transmitting member 72 is carried by the discs 70 and 71 and extends therethrough. The lower part of the force transmitting member 72 is provided with a flat surface, which is adapted to engage a convex surface at the upper end of valve member 53. Another force transmitting member 73 is similarly attached to the central portion of the diaphragm 50. The upper surface of the member 72 is recessed to receive and cooperate with a guiding projection 74 on the lower end of the member 73. The upper surface of the member 73 is similarly recessed to receive and cooperate with a guiding projection 75 which is rigidly attached to the casing of the regulator unit 17.

The amount of fuel flowing through the jet system 22 at any given time is a function of the pressure drop across that system. It is desired that this fuel flow be proportioned to the flow of air through the air passage 11. As previously described, it may be seen that the pressure at the impact tubes 30 is communicated through the vent ring 31 and the conduit 44 to the chamber 46 in the regulator 17. It has likewise been pointed out that the very low pressure at the throat of the boost venturi 34 is conveyed through the conduit 43 to the interior of chamber 47. The difference in pressures between chambers 46 and 47 produces a force acting downwardly on the diaphragm 51 and the force transmitting member 72. This force is a measure of the mass of air flowing per unit time through passage 11. The pressure in the chamber 48 may be considered as being equal to, or at least indicative of, the pressure at the intake side of the jet system 22. Furthermore, the pressure in the chamber 45 is substantially equal to that existing in the conduits 68 and 25 at the discharge side of the jet system 22. The pressure in chamber 45 is less than the pressure in chamber 48 and the differential between these two pressures exerts through the force transmitting members 72 and 73 a force tending to close valve member 53.

It may be stated that the differential between the pressures in the chambers 46 and 47 exerts an opening force on the valve 53 which is a function of the mass of air flowing through the carburetor per unit time and that differential between the pressures in the chambers 45 and 48 exerts a closing force on the valve 53, which is a function of the mass of fuel flowing through the carburetor per unit time. The position of valve member 53 at any time is determined by the position it must assume to balance the force produced by the pressure differential across the jets against the force produced by the pressure differential which measures the air flow through the passage 11.

Proper combustion conditions are attained when the mass of the air supplied to the engine is properly proportioned with respect to the mass of the fuel. Since the fuel density is substantially constant, the pressure differential across the jets, which is a direct measure of the volume of fuel flowing, may be taken as a measure of the mass of the fuel without introducing appreciable error. However, the density of the air flowing through the passage 11 varies with atmospheric pressure and with the air temperature, and hence it is necessary in measuring the air flow to correct for variations in air temperature and pressure in order that the metering force produced by the chambers 46 and 47 may accurately reflect the mass of the air passing through the passage 11 rather than its volume. This correction is made by the valve 35, which is operated by a bellows 135 mounted within the housing 37. One end of the bellows 135 is fixed to a screw 136, which threadedly engages the housing 37, so that the positions of the bellows 135 and the valve 35 with respect to the housing may be adjusted. The bellows 135 is preferably filled with nitrogen or other inert gas. Then as the pressure in the chamber 36 varies with the altitude of the aircraft, or from other causes, the change in pressure causes an expansion or contraction of bellows 135, thereby operating the valve 35 to restrict the air flowing through the boost venturi 34 to a greater or less degree. Likewise, changes in the temperature of the flowing air cause a responsive movement of the bellows 135 to operate the valve 35.

In a venturi, the difference between the pressure at the throat of the venturi and the pressure at a point upstream from the venturi is proportional to the square of the velocity of the fluid flowing thru the venturi. For any given venturi, this proportion only holds for a certain range of velocities of flow. If the velocity increases beyond this range, the proportion no longer holds, and the pressure difference is no longer an accurate measure of the quantity of fluid passing thru the venturi.

When a venturi is used to measure air flow under conditions such as those existing in an aircraft carburetor, the density of the air is subject to considerable change because of temperature and pressure variations. When the air is very thin, as at high altitudes, the velocity of air flow past the venturi of the carburetor may increase until it exceeds the limit beyond which the venturi is not accurate.

The atmospheric pressure and temperature operated valve 35 is used in my invention to throttle the flow of fluid thru the boost venturi so as to prevent the velocity of the air flowing thru it from exceeding its limits of accuracy. While the pressure differential between the throat of the boost venturi 34 and the vent ring 31 is not a measure of the velocity of the fluid flowing thru the passage 11 because of the throttling action of valve 35, it will be readily understood that by properly forming the valve 35, the pressure differential referred to may be made to accurately reflect the mass of air flowing thru the passage 11. Since, in a carburetor, it is desired to proportion the mass of the fuel to the mass of the air, it will be seen that my arrangement of the boost venturi 34 and valve 35 contributes to that result, inasmuch as the force applied to the diaphragm 51 of the regulator unit 17 is thereby made proportional to the mass of the air supplied to the carburetor.

In other words, it may be stated that by the use of valve 35, I produce a flow of air thru the boost venturi 34 whose velocity is proportional to the mass of air passing thru passage 11. I then measure the velocity of the air passing thru the boost venturi by differential pressure responsive means, and thereby secure a measurement of the mass of air supplied to the carburetor. By using this arrangement, the velocity of the air flow thru the boost venturi may be always kept within the range where that venturi is accurate.

The valve 35 is operated by the bellows 135 in accordance with the pressure at the throat of the large venturi. This pressure varies not only with atmospheric pressure, but also with the velocity of the air flowing thru the carburetor. The valve 35 therefore additionally acts as a restriction to maintain the velocity of the air flow thru the boost venturi within the range where that venturi is accurate. Furthermore, when the air flow thru the large venturi exceeds the limit of the range in which the large venturi is accurate, the error in the pressure differential set up by the large venturi is reflected in the pressure at its throat. This pressure, acting on valve 35 thru bellows 135, produces a corrective effect on the flow thru the boost venturi 34.

Prior devices of this type have been proposed wherein two venturis are cascaded in the main air passage so that the outlet of a smaller venturi is located at the throat of a large venturi. The pressure differential between the throat of the small venturi and a point upstream from both venturis is a measurement of the velocity of the flowing air, and this pressure differential may be corrected for atmospheric temperature and pressure to produce an indication of the mass of the flowing air. In such a device, however, the small venturi is subject to the full velocity of the flowing air. Therefore, at low air densities and consequent high rates of flow, the device is subject to the errors and inaccuracies inherent in the limitations of the venturi.

Since the capacity of the annular opening 42 in the throat of the boost venturi 34 is quite small, it is necessary that the chambers 47 and 46 be separate from each other, as even a small air passage between them would be sufficient to destroy the vacuum at the throat of boost venturi 34. Since the chamber 46 is in communication with the incoming air, it is possible that moisture may condense in that chamber. Hence a small drain connection 140 is provided which connects the lowest point in the chamber 46 with a point of relatively low pressure in the main air passage 11. It is realized that the conduit 140 is connected to a point in the chamber 46 which appears in the drawing to be near the top of that chamber, but it should be understood that this is only for purposes of convenience in making the drawing and that in actual practice the drain tube 140 would be connected at the lowest point in the chamber 46.

Each of the vapor traps 15 and 20 consists of a chamber, such as 76 in trap 15, normally filled with fuel and having a valve 77 in the upper portion thereof controlled by a float 78 so that the valve is closed as long as the chamber remains filled with liquid fuel. If the fuel vaporizes, the bubbles of vapor rise to the surface of these traps whereupon the float is lowered opening the valve so that the vapor may be drawn off through the opening normally closed by the valve. Each valve is provided with a sleeve 79 which operates to close the entrance ports of the valve in case the vapor trap is inverted, such as might occur when the aircraft is flying upside down. The vapor trap 15 is provided with a screen 80 for filtering the incoming fuel.

The mixture controlling unit 21 includes a disc valve 90, which is rotatable by a shaft 91 on which it is fixed. The disc valve 90 is provided with suitable ports so that it may be positioned to permit a flow of fuel from the conduit 19 through either a conduit 92 alone or through the conduit 92 and a parallel conduit 93. When the fuel is flowing through the conduit 92 only, the mixture control is said to be in the "automatic lean" position, and when the fuel is flowing through both conduits 92 and 93, the mixture control is said to be in the "automatic rich" position.

The jet system 22 includes a pair of jets 94 and 95, both of which are in communication with the conduit 92. The jet 95 is normally closed by a spring loaded valve 96 but upon the occurrence of a sufficient pressure differential across the jet 95 the valve 96 is automatically opened. The conduit 93 is connected with a jet 99. The jets 99 and 95 discharge through another jet 97, and the jets 94 and 97 discharge directly into the conduit 23.

The conduit 23 conveys the fuel to the idling control 24 which includes a jet 98. A valve member 100 is in the position shown in full lines in the drawing whenever the engine is running under load. When the engine is idling the valve member 100 moves to the position shown in dotted lines in the drawing, thereby reducing the fuel supply. The valve member 100 is controlled by a lever 101 which is connected (by means not shown) to the mechanism which operates the throttles 102 positioned in the main air passage 11. This idling control valve 98 cooperates with spring 61 to control the fuel flow under low air flow conditions. Under such conditions, the air flow metering mechanism is unreliable because of the very low flow as compared to the large cross-sectional area of the air conduit. Therefore, the spring 61 is provided to bias the valve 53 open. The valve opening force of spring 61 is opposed by the fuel pressure differential across the jet system tending to close the valve. The result is that a substantially constant fuel pressure differential is maintained (when the air pressure differential is negligible), whose value is determined by the tension of spring 61. Having such a constant fuel pressure differential, the fuel flow may then be determined by the contour of the idle valve 98 and the throttle position. In this way, a positively controlled fuel flow is obtained under idling conditions, even though the pressure differential set up by the air venturi is small and erratic.

The pressure regulator 26 comprises a housing divided into two chambers by a flexible diaphragm 103. A pair of discs 104 and 105 are clamped to the central portion of the diaphragm 103, in any suitable manner. A compression spring 106 is retained between the disc 104 and the housing of regulator 26, and biases the discs 104 and 105 for downward movement. A valve 107 is carried by the discs 104 and 105, and cooperates with a seat in the housing of regulator 26 so as to block the passage 27 when the valve is closed. The chamber above the diaphragm 103 is connected through a passage 108 to the conduit 43, wherein the pressure is considerably below atmospheric. Since the pressure in conduit 25 is above atmospheric, it will be seen that when the engine is in operation, the pressure differential on opposite sides of the diaphragm 103 is such as to maintain the valve 107 open, against the compression of spring 106. The pressure in the chamber above diaphragm 103 is so small compared to the pressure in the chamber containing valve 107 and the force of the spring 106, that that small pressure exerts no appreciable controlling effect on the regulator. The low pressure above the diaphragm 103 does, however, provide a greater differential pressure for opening the valve 107. The spring 106 opposes the pressure in the chamber below the diaphragm 103, and operates the valve in a manner to maintain that pressure substantially constant.

A primary acceleration responsive regulator 110 is shown as being mounted on the wall of the carburetor body 10 below the throttles 102. The regulator 110 consists of a hollow casing divided into two chambers by a flexible diaphragm 111. A valve stem 112 is supported centrally of the diaphragm 111, and carries at its left hand end a valve 113. A conduit 115 connects an annular chamber 114 adjacent the valve stem with the conduit 16 which is connected to the source of fuel under pressure. When the valve 113 is in the position shown, it cuts off the flow of fuel from the chamber 114 into the main air passage 11. The chamber to the left of the diaphragm in the casing 110 is sealed from the annular space surrounding the valve stem 112, and is connected with the main air passage 11 by means of a conduit 117. The chamber on the right hand side of diaphragm 111 is connected to the main air passage 11 through a conduit 118 having a restriction 120 therein.

As long as the air flow through the passage 11 remains substantially constant, the pressures in the chambers on opposite sides of the diaphragm 111 are substantially equal, so that the valve 113 is held closed by the compression spring 121. Upon a sudden opening movement of the throttles such as accompanies a sudden acceleration of the engine, the consequent sudden increase in pressure in the air passage 11 is communicated to the chamber at the left of diaphragm 111 more rapidly than to the chamber at the right, because of the restriction 120. Therefore, the valve stem 112 is moved to the right against the force of spring 121, and opens the valve 113 to provide an additional supply of fuel to the engine in order that the engine may accelerate more quickly in response to movement of the throttles.

It has been found that the additional supply of fuel provided by means of the primary regulator 110 may not be sufficient to accelerate the engine to the speed called for by the new throttle position. The action of the regulator 110 is quite rapid, and supplies an additional amount of fuel to the engine almost immediately upon opening of the throttles. This supply stops, however, as soon as the pressure conditions on the opposite sides of the diaphragm 111 have become equalized through the restriction 120. It has been found with a device of this type the extra supply of fuel may be cut off before the engine has actually accelerated to the desired speed. To overcome this condition there is provided a secondary acceleration responsive regulator shown at 125 in the drawing.

The secondary regulator 125 comprises a casing divided by a flexible diaphragm 126 into two expansible chambers. The chamber to the right of the diaphragm 126 is connected through a conduit 127 to a point in the air passage 11 downstream from the throttles 102. The diaphragm 126 carries a disc valve 128 at its central portion. The valve 128 operates with an annular seat 130, which is fixed to the body of the carburetor 10. The space inside the annular seat 130 is connected by means of a conduit 131 and a restriction 132 to the interior of chamber 45 in the fuel regulator 17. The conduit 131 is in communication with the conduit 68 through a check valve 133. When the throttles 102 are partially closed, the pressure in the chamber to the right of diaphragm 126 is low compared to the fuel pressure in the chamber 45 and in the conduit 68. Therefore, at such times check valve 133 opens, and fuel flows into the chamber at the left of diaphragm 126. The fuel is stored in this chamber. When an opening movement is given to the throttles 102, the pressure downstream from the throttles increases and the diaphragm 126 moves to the left forcing the fuel stored in the left hand chamber through the conduit 131 and restriction 132 into the chamber 45 of the fuel regulator. It will be seen that this increase in pressure in the chamber 45 has an opening effect on the fuel regulator valve 53, and thereby tends to cause the flow of an additional supply of fuel to the engine. The initiation of this increase in pressure in the chamber 45 is delayed by the restrictions 132 and the dissipation of the increased pressure is delayed by the restriction 69, so that the increased pressure is maintained over a period of time considerably longer than that required to restore a constant pressure condition in the air passage 11. The capacity of the secondary regulator 126 and the area of the restriction 132 may be so proportioned that this time delay is just sufficient to complete the acceleration of the engine to the final speed desired.

While I have shown and described a preferred embodiment of my invention, other modifications thereof will occur to those skilled in the art, and I therefore intend that my invention shall be limited only by the appended claims.

I claim as my invention:

1. Fluid flow measuring means, comprising in combination, a conduit for the fluid whose flow is to be measured, first Venturi means in said conduit, passage means having a plurality of spaced apertures opening into the throat of said Venturi means so that the pressure in said passage means is substantially equal to the average pressure at said throat, a second conduit connecting said passage means with a point in said first conduit spaced from said Venturi means, second Venturi means in said second conduit, valve means for controlling the flow of fluid thru said second conduit, means responsive to the temperature of the fluid at the entrance to said first Venturi means and to a pressure substantially equal to the static pressure of the flowing fluid at the throat of said first Venturi means for operating said valve means, differential pressure measuring means, and means connecting said measuring means to measure the pressure differential between the throat of said second Venturi means and said point.

2. Fluid flow measuring means, comprising in combination, a conduit for the fluid whose flow is to be measured, first Venturi means in said conduit for producing a pressure differential between the throat of said Venturi means and a point in said conduit spaced from said Venturi means, which pressure differential is a function of the volume of fluid passing through said Venturi means, means for amplifying said differential comprising a second conduit connecting the throat of said first Venturi means and said point, second Venturi means in said second conduit, valve means in said second conduit, means responsive to the temperature of the fluid at the entrance to said first Venturi means and to a pressure substantially equal to the static pressure of the fluid at the throat of said first Venturi means for operating said valve means so that the amplified pressure differential between the throat of said second Venturi means and said point is substantially proportional to the mass of fluid flowing thru said first-mentioned conduit.

3. A carburetor, comprising an air conduit of rectangular cross-section, first Venturi means comprising a plurality of parallel spaced hollow bars extending transversely of said conduit, each said bar having a plurality of spaced apertures opening into the throat of said Venturi means so that the pressure within said bar is substantially equal to the average pressure at said throat, a second conduit connecting the interior of said bars with a point in said first conduit spaced from said Venturi means, second Venturi means in said second conduit, valve means in said second conduit, a temperature responsive device positioned substantially centrally of said first conduit ahead of said first Venturi means for operating said valve means in accordance with the temperature of the flowing air, said spaced apertures serving to minimize the effects of uneven flow distribution due to the presence of said device in the path of the flowing air, differential pressure measuring means, means connecting said measuring means to measure the pressure differential between the throat of said second Venturi means and said point, means for supplying fluid fuel to said carburetor, and means operated by said differential pressure measuring means for controlling said fuel supplying means.

4. A carburetor, comprising an air conduit of rectangular cross-section, first Venturi means comprising a plurality of parallel spaced hollow bars extending transversely of said conduit, each said bar having a plurality of spaced apertures opening into the throat of said Venturi means so that the pressure within said bar is substantially equal to the average pressure at said throat, a housing positioned substantially centrally of said first conduit upstream from said first Venturi means in heat conducting relationship with the air flowing therethru, a sealed bellows in said housing and responsive to the pressure therein, a first passage connecting the interiors of said bars and the interior of said housing, a second passage connecting the interior of said housing with a point in said air conduit spaced from said first Venturi means, second Venturi means in said second passage having its discharge end closely adjacent said housing, a valve operated by said bellows and cooperating with said second passage at the discharge end of said second Venturi means for controlling the flow of air from said second passage into said first passage, and means responsive to the difference between the pressure at said point in said air conduit and the pressure at the throat of said second Venturi means for controlling the flow of fuel to said engine.

5. A carburetor for an internal combustion engine, comprising a main conduit for air flowing to said engine for combustion purposes, first Venturi means in said main air conduit for creating two unequal pressures whose difference is a measure of the velocity of the air flow, a second air conduit connecting the throat of said Venturi means with a point in said main conduit spaced from said Venturi means so that a flow of air thru said second conduit is induced by said unequal pressures, second Venturi means connected in series in said second air conduit, a valve in said second conduit in series with said second Venturi means for controlling the air flow thru said second conduit, a bellows subject to the pressure at the throat of said first Venturi means for operating said valve, an expansible chamber, a static pressure transmitting connection between said chamber and the throat of said second Venturi means, and means including said expansible chamber for controlling the flow of fuel to said engine.

6. A carburetor for in internal combustion engine, comprising a main conduit for air flowing to said engine for combustion purposes, Venturi means in said main air conduit for creating two unequal pressures whose difference is a measure of the velocity of the air flow, a second air conduit connecting the throat of said Venturi means with a point in said main conduit spaced from said Venturi means so that a flow of air thru said second conduit is induced by said unequal pressures, second Venturi means connected in series in said second air conduit for creating a second pressure difference varying with said velocity and greater than said first-mentioned pressure difference, a valve in said second conduit in series with said second Venturi means for modifying the air flow thru said second conduit, a bellows subject to the pressure at the throat of said Venturi means for operating said valve to modify said second pressure difference in accordance with variations in air density so that said second pressure difference is a measure of the mass of air flowing thru said main air conduit per unit time, a pair of expansible chambers separated by a movable wall structure, a pressure-transmitting connection between one of said chambers and said point in said main conduit, a lateral opening at the throat of said second Venturi means, a passage connecting said opening and the other of said chambers, said passage and chamber being blind except for said opening so that no fluid can flow into the throat of said restriction means thru said opening, and means operated by movements of said wall structure for controlling the flow of fuel to said engine.

7. A carburetor for an internal combustion engine, comprising a main conduit for air flowing to said engine for combustion purposes, first Venturi means in said main air conduit for creating two unequal pressures whose difference is a measure of the velocity of the air flow, a second air conduit connecting the throat of said Venturi means with a point in said main conduit spaced from said Venturi means so that a flow of air thru said second conduit is induced by said unequal pressures, second Venturi means connected in series in said second air conduit, a valve in said second conduit in series with said second Venturi means for controlling the air flow thru said second conduit, a bellows subject to the pressure at the throat of said first Venturi means for operating said valve, a blind passage connected to the throat of said second Venturi means, an expansible chamber connected to said passage, and means including said expansible chamber for controlling the flow of fuel to said engine.

8. A carburetor, comprising an air conduit, a first Venturi structure forming a part of said conduit, a plurality of spaced apertures opening into the throat of said Venturi structure, a passage connecting said apertures so that the pressure within said passage is substantially equal to the average pressure at said throat, a housing positioned within said first conduit upstream from said Venturi structure in heat conducting relationship with the air flowing therethru, a sealed bellows in said housing and subject to the pressure therein, a fluid-transmitting connection between said passage and the interior of said housing, a second fluid-transmitting connection between the interior of said housing and a point in said air conduit spaced from said first Venturi means, a second Venturi structure connected in series in one of said connections, a valve in one of said connections operated by said bellows for controlling the flow of air thru said second Venturi structure, and means responsive to the difference between the pressure at said point in said air conduit and the pressure at the throat of said second Venturi structure for controlling the flow of fuel to said engine.

9. A carburetor for an internal combustion engine, comprising a main conduit for combustion air flowing to said engine, a venturi forming a part of said conduit for producing two unequal pressures whose difference is a measure of the velocity of air flowing thru said conduit, a second conduit connecting the throat of said venturi with a point in said main conduit spaced from said throat so that a flow of air is induced thru said second conduit by the difference of said pressures, said second conduit terminating at the throat of said venturi in a plurality of spaced apertures thru the walls of said throat so that the pressure at the throat end of said second conduit is substantially equal to the average pressure at said throat, a temperature responsive device in said main conduit upstream from said venturi, said spaced apertures serving to minimize the effects of uneven flow distribution due to the presence of said device in the path of the flowing air, a valve for modifying the flow thru said second conduit, a connection between said device and said valve for operating said valve in accordance with the temperature of the air in said main conduit, and means responsive to the rate of air flow thru said second conduit for controlling the flow of fuel to said engine.

10. Apparatus for measuring the rate of flow of a fluid of variable density, comprising a main conduit for said fluid, a venturi forming a part of said conduit for producing two unequal pressures whose difference is a measure of the velocity of the fluid flowing thru said conduit, the throat of said venturi having a plurality of spaced apertures in the walls thereof a second conduit connecting the throat of said venturi with a point in said main conduit spaced from said throat so that a flow of fluid is induced thru said second conduit by the difference of said pressures, said second conduit terminating at the throat of said venturi in said plurality of spaced apertures thru the walls of said throat so that the pressure at the throat end of said second conduit is substantially equal to the average pressure at said throat, a temperature responsive device in said main conduit upstream from said venturi, said spaced apertures serving to minimize the effects of uneven flow distribution due to the presence of said device in the path of the flowing fluid, a valve for modifying the flow thru said second conduit, a connection between said device and said valve for operating said valve in accordance with the temperature of the fluid in said main conduit, and means for measuring the rate of fluid flow thru said second conduit.

11. Apparatus for measuring the rate of flow of a fluid of variable density, comprising a conduit for said fluid, a first Venturi structure forming a part of said conduit, there being a plurality of spaced apertures opening into the throat of said Venturi structure, a passage connecting said apertures so that the pressure within said passage is substantially equal to the average pressure at said throat, a housing positioned within said first conduit upstream from said Venturi structure in heat conducting relationship with the fluid flowing therethru, a sealed bellows in said housing and responsive to the pressure and temperature of the fluid therein, a fluid transmitting connection between said passage and the interior of said housing, a second fluid transmitting connection between the interior of said housing and a point in said fluid conduit spaced from said first Venturi means, a second Venturi structure in one of said connections, a valve in one of said connections operated by said bellows for controlling the flow of fluid thru said second Venturi structure, and means for measuring the difference between the pressure at said point in said main conduit and the pressure at the throat of said second Venturi structure.

HAROLD F. TWYMAN.